United States Patent [19]
Barbiaux et al.
[11] Patent Number: 4,804,937
[45] Date of Patent: Feb. 14, 1989

[54] VEHICLE MONITORING ARRANGEMENT AND SYSTEM

[75] Inventors: William J. Barbiaux, Schaumburg; Timothy D. McCarthy, Arlington Heights, both of Ill.; Steven D. Bromley; Gary W. Milliorn, both of Austin, Tex.

[73] Assignee: Motorola, Inc., Schaumburg, Ill.

[21] Appl. No.: 54,471

[22] Filed: May 26, 1987

[51] Int. Cl.[4] .............................................. B60Q 1/00
[52] U.S. Cl. ................................ 340/52 F; 340/52 R; 340/525; 364/424.01; 364/550; 307/10 R
[58] Field of Search .................... 340/52 F, 52 R, 525, 340/539, 992–994, 988, 825.06, 825.22, 825.29, 825.55, 825.69, 825.72; 307/10 R; 364/424, 550, 551

[56] References Cited

U.S. PATENT DOCUMENTS

| | | | |
|---|---|---|---|
| 3,644,883 | 2/1972 | Borman et al. | 340/23 |
| 4,009,375 | 2/1977 | White et al. | 340/988 |
| 4,258,421 | 3/1981 | Juhasz et al. | 364/424 |
| 4,267,569 | 5/1981 | Baumann et al. | 364/431 |
| 4,287,565 | 9/1981 | Haubner et al. | 364/580 |
| 4,354,252 | 10/1982 | Lamb et al. | 364/424 |
| 4,374,380 | 2/1983 | Giepen et al. | 340/660 |
| 4,581,708 | 4/1986 | Ostrand et al. | 364/510 |
| 4,581,711 | 4/1986 | Hirata et al. | 364/550 |
| 4,584,487 | 4/1986 | Hesse et al. | 307/10 R |
| 4,593,357 | 6/1986 | Van Ostrand et al. | 340/52 F |
| 4,602,127 | 7/1986 | Neely et al. | 340/52 F |
| 4,630,043 | 12/1986 | Haubner et al. | 340/825.57 |

FOREIGN PATENT DOCUMENTS 1194750 11/1985 Sweden .

OTHER PUBLICATIONS

"CADEC Vehicle Information System", Cummins Engine Co., Bulletin 3604790, 4/85.
"CADEC Systems", Standard OTC Stock Reports, Apr. 29, 1985.
"Dateline News: 12/84", Fleet Owner, Dec. 1984, p. 18.
"Stemco Instruments the Ultimate Computerized Trip Recording System", Publication No. B100-3-86.
"Computerized Trip Recording . . . Engler VMS", Engler Instruments, 1/85.
"New Product Headliners", Fleet Owner, Jul. 1986, p. 38.
"Products & Services", Commercial Carrier Journal, Jun. 1986, pp. 88–90.
"Vehicle Management Systems", Fleet Electronics, Nov. 1984.
"TRW Electronic Recorder", TRW, Inc., 1984, publication No. 0505A00001.
"Fully Integrated Truck Information and Control Systems (TIACS)", SAE Technical Paper Series, 8311775.
"A Portable Electronic Vehicle Use Recorder", SAE Technical Paper Series, 840312.

(List continued on next page.)

*Primary Examiner*—Donnie L. Crosland
*Attorney, Agent, or Firm*—Robert J. Crawford

[57] ABSTRACT

A vehicle monitoring system is described having an arrangement installed within a vehicle, wherein the system includes an external data terminal for communicating information to a remotely located base station. The arrangement includes a plurality of communication modules, each being capable of communicating messages associated with performance of the vehicle; a data bus member for electrically intercoupling the plurality of communication modules and for receiving the communicated messages therefrom; a driver interface module for transmitting messages to and for receiving messages from a vehicle operator; and a recorder coupled to the data bus member for recording information associated with performance of the vehicle which has been transmitted over the data bus member by the plurality of communication modules, coupled to the driver interface module via a second data bus member for transferring messages therebetween. The external data port is provided by the recorder and is used for communicating messages with the base station, preferably over an RF link.

4 Claims, 3 Drawing Sheets

OTHER PUBLICATIONS

"Driver Information System", XATA, 1985.
"Fleetmaster Vehicle Monitoring System", Technical Brochure.
"Communication Driver-Vehicle-Fleet", Research and Development work at Daimler-Benz.
"Fleet Data Master System", Advanced Recording Instruments, Inc.
"Introduction to the Anchron Data-Com System", Anchron, Inc., 6-30-85.
"Computer Technology in Motion", Anchron, Inc. 3-19-86.
ARGO FMS 1330, Fleet Management Systems, 36C 86.
ARGO FMS 1330, "Driver Input Device", Fleet Management Systems, 101D86.
"Fleet-Management-System FMS 1330", Product Information P178, Fleet Management Systems.
"Tripmaster—Your Total Fleet Management System that Fights Escalating Operating Costs . . . ", Rockwell International, pp. 1-19.
"Tripmaster Trip Recording System—The Proven Key to Controlling Operating Costs", Rockwell International, pp. 1-15.
"Tripmaster Plus—Operational Driver Keypad/Display", 1986 Rockwell International, publication No. SP-8642 (16579) (2-86).
"The Information Tripfax Software", Rockwell International, pp. 1-15.
"On-Board Monitoring System Improves Vehicle Performance", Diesel & Gas Turbine, Progress, May 1979.
"Systems to the Delivery", Institutional Distr., pp. 144-148.
Products and Services, "Rockwell Tripmaster Improved", Commercial Carrier Journal, Mar. 1984, p. 80.
"Tripmaster Topics", Rockwell International, Winter Issue 1984/85, pp. 1-6.
"Rockwell Tripmaster System".
"Trip Recording System BT03D200 Series", Rockwell International, Automotive Field Maintenance Manual No. 22, pp. 1-29.
Known to Applicant: Hewlett Packard's HP-IB (Interface Bus).

VEHICLE MONITORING ARRANGEMENT AND SYSTEM

FIELD OF THE INVENTION

The present invention relates generally to monitoring systems, and, more particularly, to vehicular monitoring and subsequent communication of data collected during such monitoring.

DESCRIPTION OF THE PRIOR ART

Vehicle recording devices are useful for a variety of applications pertaining to both operator and vehicle communication and control. In regard to the vehicle operator, the vehicle recording device may be used to log such items as the operator's driving time, trip time and stopping time for meals. In regard to the vehicle itself, the recording device may be used to record fuel efficiency on a trip by trip basis, engine temperature parameters and other related information. This information may be subsequently analysed by a vehicle technician for maintenance purposes. Additionally, the information may be used in a business delivery environment by the operator's manager to optimize driver efficiency and performance and to track deliveries made by the vehicle over a given period of time.

Although it is known that such information is useful for those reasons discussed above, previous implementations of such systems have failed to effectuate convenient control and access to the system. More specifically, known systems have failed to provide effective system maintenance, effective access of information recorded in the system, effective calibration of vehicle components used by the monitoring system, and they have failed to provide an effective means of updating personal instruction information for the vehicle operator.

Accordingly, there is a need for a vehicle monitoring system which overcomes the aforementioned deficiencies.

OBJECTS AND BRIEF SUMMARY OF THE INVENTION

It is a general object of the present invention to provide a vehicle monitoring system which overcomes the above mentioned shortcomings.

It is a more specific object of the present invention to provide a vehicle monitoring system wich can remotely access the data recorded by the system and which can be remotely programmed and controlled in such a manner so as to optimize the maintenance of the system.

It is an additional object of the present invention to provide a vehicle monitoring system which can be readily implemented in a vehicle having previously installed sensors, independent of the type of sensor output.

The present invention may briefly be described in terms of a preferred embodiment involving a vehicle monitoring system wherein individual vehicle monitoring arrangements are installed within respective vehicles for logging the operation of the vehicle and information input by the driver. The vehicle monitoring arrangements each include a plurality of communication modules interconnected through a data bus member for transmitting information associated to the operation of the vehicle to a centrally situated control module. The control module records this transmitted information, and subsequently, when located within RF range of a base station, the control module transmits this information to the base station, preferably by means of an RF transmitter.

A driver interface module is included for transmitting messages to and for receiving messages from the driver of the vehicle. The driver interface module is connected to the control module through both a high speed link and via the data bus member. The high speed link provides means for communicating lengthy streams between the driver interface module and the base station without tying up the data bus member. The connection to the control module through the data bus member is used by the driver interface module to monitor messages transmitted to the plurality of communication modules. When particular messages are transmitted, of which the driver of the vehicle should be informed, the driver interface module displays the message for the driver's observation.

A sensor interface module and an instrument cluster are provided in the arrangement with access to the data bus member as well as to the control module, the latter through a hard wired analog interface. By providing both interfaces to the control module, a number of advantages are realized, including the capability of remotely choosing which of the two is most appropriate for the given circumstances.

Other advantages, as will be discussed, include the capability of remotely accessing and programming the monitoring arrangements from the base station.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in which like reference numerals identify like elements, and wherein:

DETAILED DESCRIPTION OF THE PREFERRED EMBODIMENT

The system disclosed in this specification has particular use for data logging as may be utilized for vehicular operations. More particularly, this system has applicability for monitoring the operations of trucks and commercially operated vehicles where record keeping of driver related information and the mechanical operation of the vehicle are of concern.

Figure 1:
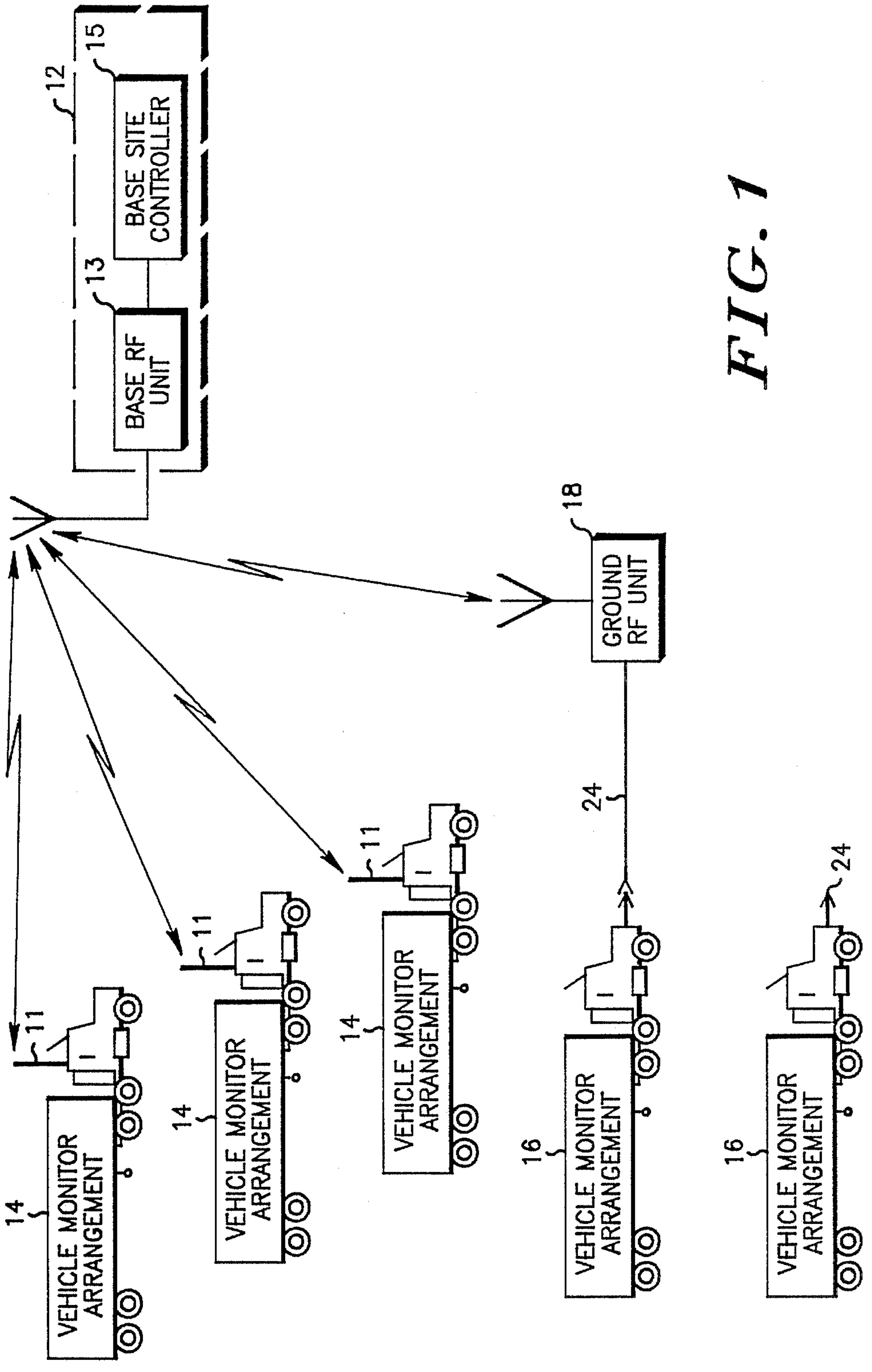
FIG. 1 is a diagram of a vehicle monitoring system, according to the present invention.

Such an application is shown in FIG. 1 where two types of trucks are depicted in communication with a base station 12. The base station includes a base RF unit (BRFU) 13 for RF communication between the trucks and a base site (station) controller (BSC) 15. The BSC allows data to be input to the trucks and data to be remotely accessed in response to commands from the BSC.

The first type of truck 14 includes those with antennas 11 mounted thereon, while the second type include those trucks 16 without antennas. Both types of trucks 14 and 16 include vehicle monitoring arrangements (VMA) which are used to monitor, record and communicate operational data relating to the vehicle between the respective vehicle and the base station 12. The trucks 14 which include antennas 11, have installed therein a VMA which includes equipment for communicating (transmitting and/or receiving) data over the air (via an RF interface) directly to the base station 12. Those trucks 16 which do not include an antenna 11 have installed therein a VMA which does not include an RF interface, and which must be indirectly coupled to the base station 12 through a ground RF unit (GRFU) 18.

The GRFU 18 is a fixed RF station which allows trucks which do not include an RF interface to readily communicate with the base station 12 through a plugable wired connection hook-up. Typically, when a truck 16 approaches the GRFU 18, a cable 24 is connected between the VMA installed within the truck 16 and the GRFU 18. Communication is initiated between the VMA and the BSC and maintained until the requisite communication is complete, at which time the cable is disconnected.

Figure 2:
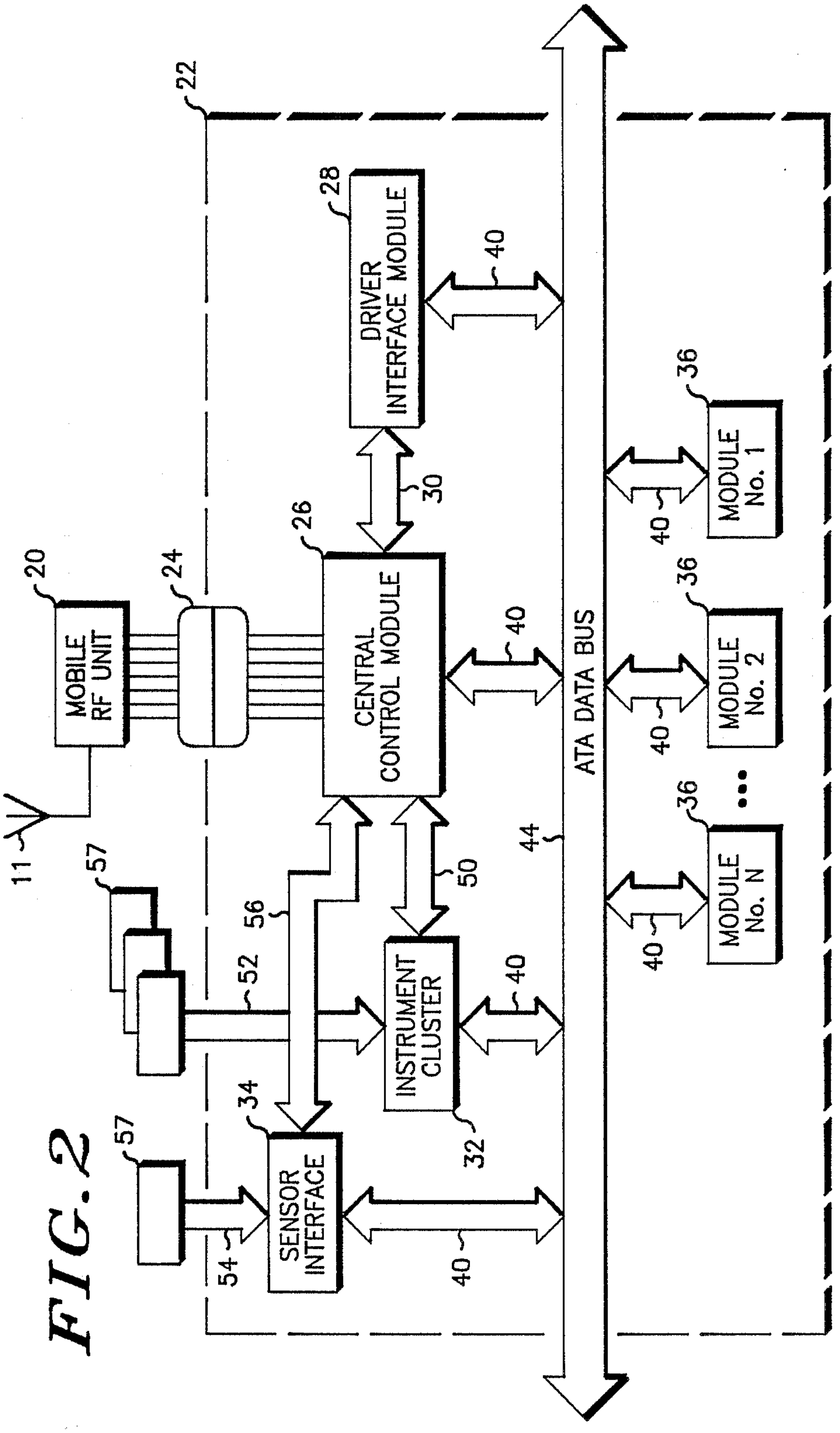
FIG. 2 is a diagram of a vehicle monitoring arrangement for use within a vehicle which may be utilized in the system (of FIG. 1), according to the present invention.

In FIG. 2, a block diagram illustrates both kinds of VMAs. The VMA used for the truck 16 which does not employ an antenna 11 includes only a fundamental VMA 22, while the VMA used for the truck 14 employing the antenna 11 includes a fundamental VMA 22 and a mobile RF unit (MRFU) 20. The MRFU 20 provides an RF interface aboard the vehicle for direct RF communication with the base station 12. For either kind of VMA, a plugable cable 24 is used to establish an RS422 interface between the fundamental VMA 22 and the RF transmitting unit, being either the MRFU 20 or the GFRU 18. Thus, when using the GRFU 18 to communicate between the VMA and the base station 12, the plugable cable 24 is connected to the GRFU 18 and an external data port 25 at the central control module 26, thereby allowing a direct bypass of the MRFU 20.

A Mostar brand radio, employed with a conventional RF modem, available from Motorola Inc., may be utilized to implement both the BRFU 13 (FIG. 1) and the MRFU 20. An IBM Personal Computer (PC) may be utilized to implement the BSC 15.

Both the vehicle sensor interface 34 and the electronic instrument cluster 32 may be implemented using an MC68HC11 microcomputer manufactured by Motorola, Inc, wherein the peripheral input ports may be used to receive the sensor input signals and the serial data ports may be used to communicate on the data bus member 44.

The fundamental VMA 22 includes a central control module 26 which is used to communicate information between the fundamental VMA 22 and the base station 12 (through the BRFU 13 or MRFU 20), and to record information generated within the fundamental VMA 22. The fundamental VMA 22 also includes a driver interface module 28, an electronic instrument cluster 32, a sensor interface 34 and a plurality of optional modules 36; each of which is coupled to the central control module 26 through a data bus member 44, preferably an ATA (American Truck Association) data bus as described in Society of Automotive Engineering (SAE) J1708 and J1587.

The driver interface module 28 is coupled to the central control module through a high speed link 30 and is used as a terminal for displaying information to and for receiving information from the driver or operator of the vehicle. The driver interface module includes a keyboard for entry of information such as delivery and travel logging information, and an LCD display to inform the driver of various status information such as vehicle operation status and delivery routing information.

The high speed interface 30 is needed because of the type of data which is communicated between the driver interface module 28 and the base station 12. Typically, information transferred from the base station 12 to the driver interface module 28 includes such information as delivery listings and schedule information, whereas information transferred from the driver interface module 28 to the base station is accumulated logging information. Due to the potential length of such information, a high speed communication path is necessary to avoid excessive delays of data transfer which would otherwise tie-up the data bus member 44 when the vehicle approaches RF communication range of the base station. This is due to the fact that the ATA data bus is dedicated to communicate short bursts of information between the various modules connected thereto, utilizing the ATA data bus for the type of information communicated to/from the driver interface module would be highly inefficient.

The driver interface module 28 is also coupled to the ATA data bus 44 through a serial communications data bus 40 (as described in SAE J1708). The driver interface module 28 utilizes this communications path to monitor the ATA bus for specific messages, such as low oil pressure, high water temperature, etc. If such messages are recognized, they are displayed for the driver's viewing.

The instrument cluster 32 provides the driver with required vehicle related information such as speedometer, odometer, tachometer, fuel level, engine coolant temperature, engine oil pressure, battery voltage, engine hours and trip odometer information. Respective serial communications data busses 40, as described in SAE J1708 and J1587, are employed along with the ATA data bus 44 (in actuality these busses 40 and 44 may be viewed as a single bus) to provide a communication path between the central control module 26 and the instrument cluster 32. Both the control module 26 and the instrument cluster 32 employ the data busses 40 to access the ATA data bus 44. When the control module 26 is instructed by the base station 12 to access the instrument cluster 32, the following sequence of events occurs:

A command is broadcast onto the ATA data bus 44 in accordance with SAE J1587;

the command is recognized and interpretted by the instrument cluster 32;

the instrument cluster 32 responds to the command by transmitting information onto the ATA data bus, pursuant to SAE 1587, including a central control module designation address; and the central control module 26 either records the information for subsequent transmission to the base station 12 or immediately responds to the base station 12 through the MRFU 20 or the GRFU 18.

A second communications path is established between the central control module 26 and the instrument cluster 32 via a direct analog connection bus 50. This communications path is used for applications wherein the instrument cluster has not been designed or modified to communicate on the ATA data bus 4, in which case the input sensor lines 52 are directly connected to input ports (shown and discussed in more detail in FIG. 3) of the central control module 30.

The sensor interface 34 provides a multiplexing function to the VMA. The sensor interface 34 receives a plurality of miscellaneous sensor inputs 54 and intelligently combines this received information for transmission onto the ATA data bus 44. Such sensor inputs 54 may include speedometer, odometer, tachometer, fuel level, engine coolant temperature, engine oil pressure, battery voltage, engine hours and trip odometer information. Similar to the analog connection bus 50 between the control module 26 and the cluster 32, a separate analog connection bus 56 is provided between the sensor interface 54 and the control module 26 to allow direct communication therebetween for applications which do not accomodate communication of the miscellaneous sensor inputs 54 onto the ATA data bus 44.

The plurality of optional modules 36 may be used to interface various functional devices to the ATA data bus. Such functions may include power train controls, brake system controls, steering system controls, suspension controls, and body, cab and trailer modules. Other applications may necessitate employing one of the optional modules as a secondary recording device, such as a recorder for a bar code reader or for recording diagnostic information.

Both analog ports 50 and 56 from the central control module 26 provide an alternate communications path to a variety of sensors 57. Since the control module 26 must select either the ATA data bus 44 or the analog communication path (50 or 56) for communicating with the sensor interface 34 or the cluster 32, the base station 12 instructs the central control module as to which path of communication should be established. This remote communication path selection has a threefold advantage. First, each VMA may be installed in the vehicle without the installation technician wiring an additional communication selection switch. As the vibrational environment of the vehicle does not facilitate the use of programmable switches, a soldered or crimped connection would otherwise be required. Second, in applications where the cluster or sensor interface is capable of communicating over both communication paths, if a failure occurs on one communication path, the other may be remotely programmed, via the base station 12, as a replacement, thereby alleviating the need for a technician to rewire or reconfigure the VMA. Finally, since the alternative communications path accomodates both analog and ATA data bus for both the sensor interface 34 and the cluster 32, only a single VMA design type is required.

Figure 3:
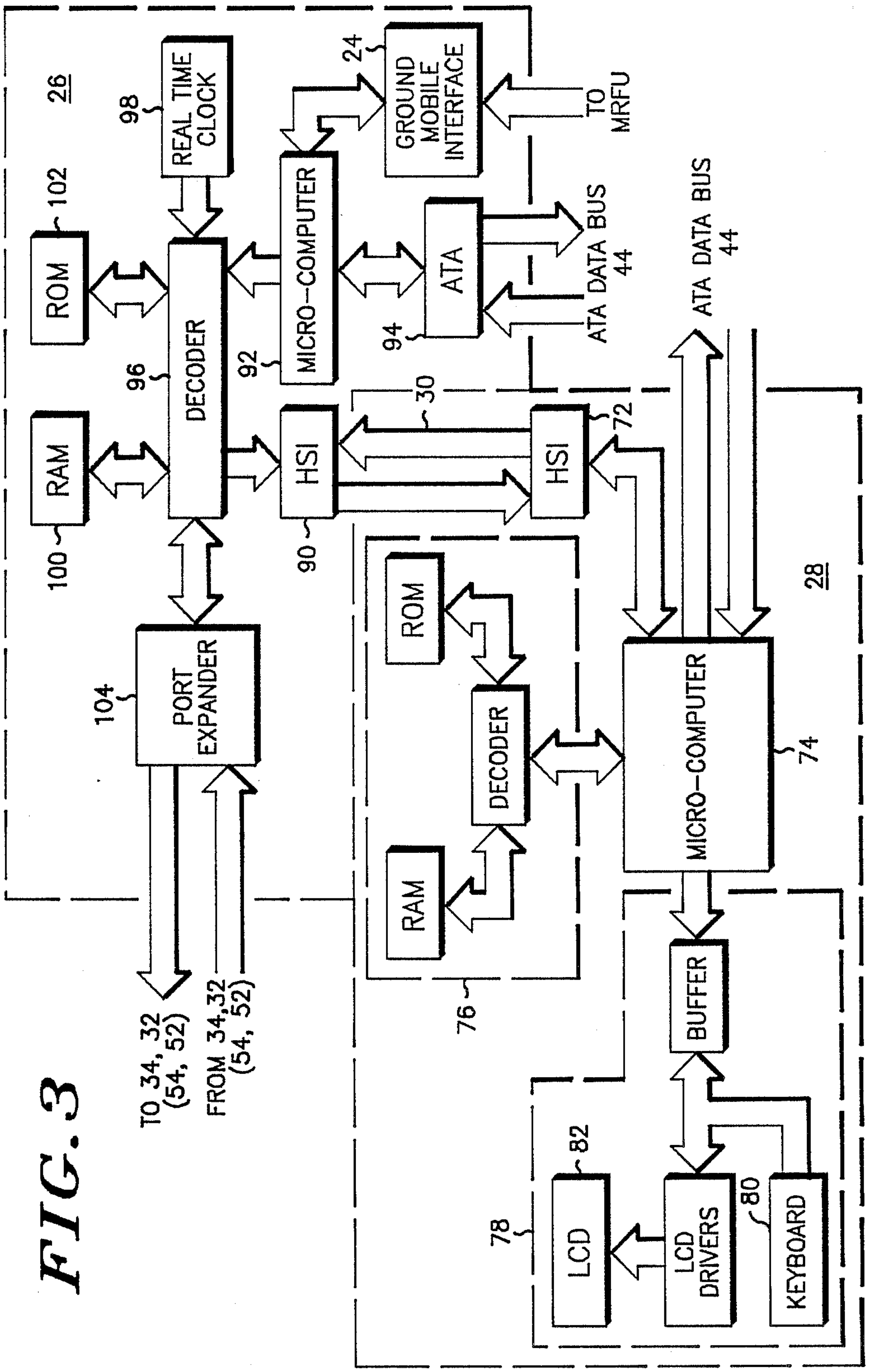
FIG. 3 is an expanded diagram of blocks 26 and 28 from FIG. 2.

FIG. 3 illustrates an expanded block diagram of both the central control module 26 and the driver interface module 28. The driver interface module 28 communicates with the control module 26 through the high speed interface 30, discussed previously. Within the driver interface module 28, data is received and transmitted through a high speed interface circuit 72, such as first-in-first-out (FIFO) buffers. A microcomputer 74, such as an MC68HC11 available from Motorola, Inc., controls data communicated over the high speed interface 30 as well as data communicated over the ATA data bus 44. The microcomputer 74 employs conventional memory access 76 for program control, and employs a conventional terminal like device 78 for keyboard 80 entry and display to the driver via a liquid crystal display (LCD) 82.

The central control module 26 includes similar high speed interface circuitry 90 as is employed (72) by the driver interface module 28. A microcomputer 92 (preferably an MC68HC11) is utilized to control the high speed interface data flow as well as data flow through the remainder of the control module 26. The remaining data flow includes communication over the ATA data bus 44 via an ATA bus interface circuit 94, and communication with the MRFU 20 or the GRFU 18 via the pluggable cable (pluggable cable) 24.

The ATA bus interface circuit 94 may be implemented using a conventional serial bus data transfer means coupled to a TI (Texas Instruments) 75176 serial data bus driver IC (integrated circuit).

The microcomputer 92 employs conventional decoding circuitry 96 to access the high speed interface 90 as well as a real time clock 98, RAM 100 and ROM 102, and a port expander circuit 104.

The port expander circuit 104 allows multiplexing and demultiplexing functions for the analog input paths (50 and 56 in FIG. 2) from the instrument cluster 32 and the sensor interface 34, respectively. Output control from the central control module 26 is accomplished through the port expander 104 where a direct connection to the various sensors is provided at the sensor interface 34 and the instrument cluster 32. Control over these sensors through either communication path allows the base station 12 to remotely calibrate each sensor through commands issued to the central control module 26.

For example, an oil pressure sensor connected to the sensor interface module 34 may require periodic calibration in order to compensate for normal mechanical engine wear. This may be accomplished, once a mechanic has determined the correct calibration setting (using a calibrated oil pressure gauge), by entering the desired calibration setting at the base station 12 and transmitting the setting information to the central control module 26 in the VMA to allow the control module 26 to program the sensor, via the selected communication path, to the setting.

Accordingly, the present invention provides a system and apparatus for monitoring, recording and subsequently communicating vehicle related information between a base station and respective apparatus installed within a plurality of vehicles. The specific apparatus installed within each vehicle provides an arrangement for efficiently communicating with the base station such that effective system maintenance, effective access of information recorded in the system, effective calibration of vehicle components, and effective updating of personal instruction information for the vehicle operator is provided.

It will be understood by those skilled in the art that various other modifications and changes may be made to the present invention without departing from the spirit and scope thereof.

What is claimed is:

1. A vehicle monitoring arrangement, comprising:
   - a plurality of communication modules, each being capable of communicating messages associated with performance of the vehicle;
   - a vehicle sensor for indicating a vehicle condition parameter;
   - a data bus member for electrically intercoupling said plurality of communication modules and the vehicle sensor, and for receiving said communicated messages therefrom;

a recording module having two data paths for receiving information associated with performance of the vehicle, said two data paths including a first data path coupled to said data bus member for receiving information which as been transmitted over the data bus member by said plurality of communication modules and including a second data path for receiving messages directly from the vehicle sensor; and remote programming means for communicating with said recording module, and for selectively programming the recording module to receive and monitor indications from the vehicle sensor using one of the two data paths.

2. A vehicle monitoring arrangement, according to claim 1, further including a sensor interface module, coupled to the vehicle sensor and the data bus member, for adapting the vehicle sensor to communicate on the data bus member.

3. A vehicle monitoring arrangement, according to claim 1, wherein said remote programming means is RF coupled to said recording module.

4. A vehicle monitoring arrangement capable of communicating information with a base station and having a plurality of communication modules, each capable of communicating messages associated with performance of the vehicle over a first data bus member in the form of short data bursts, the arrangement, comprising:

a driver interface module having a display for transmitting messages to a vehicle operator and a keyboard for receiving messages from the vehicle operator;

an RF unit for transmitting messages to and receiving messages from the base station; and central control means:

coupled to the data bus member and having a microcomputer and memory for recording information associated with performance of the vehicle which has been transmitted over the data bus member by the plurality of communication modules, coupled to said driver interface module via a second data bus member and having a high speed interface circuit for transferring messages therebetween in the form of relatively long data streams and at relatively high speeds, and including an external data port capable of direct electrical connection with the base station for communication therewith, and capable of communication with the base station through the RF unit.

* * * * *